(12) United States Patent
Kwon et al.

(10) Patent No.: US 10,447,087 B2
(45) Date of Patent: Oct. 15, 2019

(54) WIRELESS POWER TRANSMISSION APPARATUS FOR HIGH EFFICIENCY ENERGY CHARGING

(71) Applicants: Samsung Electronics Co., Ltd., Suwon-si (KR); Industry-Academic Cooperation Foundation, Dankook University, Yongin-si (KR)

(72) Inventors: Ui Kun Kwon, Hwaseong-si (KR); Sang Joon Kim, Hwaseong-si (KR); Seung Keun Yoon, Seoul (KR); Yeong Seok Ko, Yongin-si (KR); Shi Hong Park, Yongin-si (KR)

(73) Assignees: Samsung Electronics Co., Ltd., Suwon-si (KR); Industry-Academic Cooperation Foundation, Dankook University, Yongin-si (KR)

( * ) Notice: Subject to any disclaimer, the term of this patent is extended or adjusted under 35 U.S.C. 154(b) by 0 days.

(21) Appl. No.: 15/583,229

(22) Filed: May 1, 2017

(65) Prior Publication Data

US 2017/0237279 A1 Aug. 17, 2017

Related U.S. Application Data

(63) Continuation of application No. 14/198,811, filed on Mar. 6, 2014, now Pat. No. 9,641,016.

(30) Foreign Application Priority Data

Jun. 7, 2013 (KR) .......... 10-2013-0065307

(51) Int. Cl.
  *H02J 7/00* (2006.01)
  *H02J 50/12* (2016.01)
  (Continued)

(52) U.S. Cl.
  CPC .............. *H02J 50/12* (2016.02); *H02J 5/005* (2013.01); *H02J 7/025* (2013.01); *H02J 7/045* (2013.01)

(58) Field of Classification Search
  CPC .. H02J 50/12; H02J 7/025; H02J 5/005; H02J 50/10; H02J 7/0052; H02J 7/007; H01F 38/14; H01F 2038/146
  (Continued)

(56) References Cited

U.S. PATENT DOCUMENTS 5,909,362 A 6/1999 Adams
7,102,415 B1 * 9/2006 Potanin ............ G01R 19/16571
                                                    320/162

(Continued)

FOREIGN PATENT DOCUMENTS

CN 2159082 Y 3/1994
CN 1826715 A 8/2006
(Continued)

OTHER PUBLICATIONS

Chinese Office Action dated Aug. 2, 2017 in corresponding Chinese Patent Application No. 20140114286.6 (19 pages in English and 9 pages in Chinese).
(Continued)

*Primary Examiner* — Nghia M Doan
(74) *Attorney, Agent, or Firm* — NSIP Law

(57) ABSTRACT

A wireless power transmission apparatus for high efficiency energy charging, includes a resonator configured to transmit power, and a power supply unit configured to supply power to the resonator. The apparatus further includes a first switching unit configured to connect the resonator to the power supply unit, and disconnect the resonator from the power supply unit, and a controller configured to control the first switching unit based on an amount of current flowing into the resonator.

6 Claims, 12 Drawing Sheets

(51) Int. Cl.
*H02J 7/02* (2016.01)
*H02J 5/00* (2016.01)
*H02J 7/04* (2006.01)

(58) Field of Classification Search
USPC .......................................................... 320/108
See application file for complete search history.

(56) References Cited

U.S. PATENT DOCUMENTS

| | | | |
|---|---|---|---|
| 8,686,698 B2 | 4/2014 | Lopata et al. | |
| 8,947,044 B2* | 2/2015 | Kao | H02J 17/00 |
| | | | 320/108 |
| 8,976,545 B2 | 3/2015 | Samejima et al. | |
| 9,369,006 B2* | 6/2016 | Kwon | H02J 5/005 |
| 9,767,954 B2* | 9/2017 | Kim | H01F 38/14 |
| 2009/0096413 A1 | 4/2009 | Partovi et al. | |
| 2010/0001845 A1 | 1/2010 | Yamashita | |
| 2011/0310640 A1 | 12/2011 | Tao | |
| 2012/0169137 A1 | 7/2012 | Lisi et al. | |
| 2013/0069442 A1* | 3/2013 | Kim | H02J 5/005 |
| | | | 307/104 |
| 2013/0099590 A1 | 4/2013 | Ma et al. | |
| 2013/0127405 A1* | 5/2013 | Scherer | H02J 7/025 |
| | | | 320/108 |

FOREIGN PATENT DOCUMENTS

| | | |
|---|---|---|
| CN | 101170264 A | 4/2008 |
| CN | 103023158 A | 4/2013 |
| JP | 2011-1148866 A | 6/2011 |
| JP | 2012-135198 A | 7/2012 |
| JP | 2013-70477 A | 4/2013 |
| KR | 10-2008-0095643 A | 10/2008 |
| KR | 10-2012-0083517 A | 7/2012 |
| KR | 10-2013-0031765 A | 3/2013 |
| KR | 10-1254092 B1 | 4/2013 |
| KR | 10-2013-0044647 A | 5/2013 |
| WO | WO 2013/058178 A1 | 4/2013 |

OTHER PUBLICATIONS

Extended European Search Report dated Oct. 14, 2014 in corresponding European patent application No. 14161086.5. (5 pages in English).

Japanese Office Action dated Feb. 20, 2018 in Japanese Patent Application No. 2014-0105072 (2 pages in English, 5 pages in Japanese).

Extended European Search Report dated May 22, 2018 in corresponding European Application No. 18155203.5 (6 pages in English).

Korean Office Action dated Aug. 16, 2018 in Korean Patent Application No. 10-2013-0065307 (4 pages in English, 5 pages in Korean).

* cited by examiner

WIRELESS POWER TRANSMISSION APPARATUS FOR HIGH EFFICIENCY ENERGY CHARGING

CROSS-REFERENCE TO RELATED APPLICATION

This application is a continuation of U.S. patent application Ser. No. 14/198,811 filed on Mar. 6, 2014, which claims the benefit under 35 USC 119(a) of Korean Patent Application No. 10-2013-0065307, filed on Jun. 7, 2013, in the Korean Intellectual Property Office, the entire disclosure of which is incorporated herein by reference for all purposes.

BACKGROUND

1. Field

The following description relates to a wireless power transmission apparatus for high efficiency energy charging.

2. Description of Related Art

Research on wireless power transmission has been started to overcome issues, such as an increasing inconvenience of wired power supply and limits to existing battery capacities, due to an increase in various electronic devices including mobile devices. In particular, research has been concentrated on near-field wireless power transmission. Near-field wireless power transmission refers to wireless power transmission for a case in which a distance between a transmission coil and a reception coil is sufficiently short, when compared to a wavelength in an operation frequency. In the near-field wireless power transmission, a resonator isolation (RI) system may be used. The RI system using resonance characteristics may include a source device configured to supply power and a target device configured to receive the supplied power. Research on more efficient wireless power transmission has continued.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus for high efficiency energy charging, includes a resonator configured to transmit power, and a power supply unit configured to supply power to the resonator. The apparatus further includes a first switching unit configured to connect the resonator to the power supply unit, and disconnect the resonator from the power supply unit, and a controller configured to control the first switching unit based on an amount of current flowing into the resonator.

The controller may include a current sensor configured to sense the amount of the current.

The current sensor may include a second switching unit configured to control a flow of current mirrored from the current flowing into the resonator, and a comparator configured to compare voltage corresponding to the mirrored current to predetermined voltage corresponding to an amount of predetermined current. The controller may be configured to control a turning on and off of the first switching unit based on a result of the comparing.

The first switching unit may include a transistor, and the second switching unit may include a mirror transistor smaller than the transistor of the first switching unit.

The controller may be configured to turn off the first switching unit in response to the amount of the current being greater than or equal to an amount of predetermined current.

The controller is configured to turn on the first switching unit in response to the amount of the current being less than or equal to an amount of first predetermined current, and turn off the first switching unit in response to the amount of the current being greater than or equal to an amount of second predetermined current.

The power supply unit may include an input resistor, and the controller may include a current sensor configured to sense the amount of the current based on voltage applied to the input resistor.

The current sensor may include a comparator configured to compare the voltage applied to the input resistor to predetermined voltage corresponding to an amount of predetermined current. The controller may be configured to control a turning on and off of the first switching unit based on a result of the comparing.

The first switching unit may include a transistor disposed between the power supply unit and the resonator, and a diode connected in series to the transistor.

In another general aspect, a wireless power transmission apparatus for high efficiency energy charging, includes a resonator configured to transmit power, and a power supply unit configured to supply power to the resonator, and including an input resistor. The apparatus further includes a switching unit configured to connect the resonator to the power supply unit, and disconnect the resonator from the power supply unit, and a voltage controller configured to control voltage applied to the input resistor.

The voltage controller may include a direct current-to-direct current (DC-DC) converter.

The apparatus may further include a controller configured to control the switching unit based on a result of comparing an amount of current flowing into the resonator to an amount of predetermined current.

The controller may be configured to turn off the switching unit in response to the amount of the current being greater than or equal to the amount of the predetermined current.

In still another general aspect, a wireless power transmission apparatus for high efficiency energy charging, includes a resonator configured to transmit power, and a power supply unit configured to supply power to the resonator. The apparatus further includes a switching unit configured to connect the resonator to the power supply unit, and disconnect the resonator from the power supply unit, and a current controller configured to control current flowing into the resonator based on an operation of the switching unit.

The current controller may include an inductor disposed between the power supply unit and the switching unit, and a diode connected in parallel to the inductor.

The current controller may be configured to control the current flowing into the resonator when the switching unit is turned off, to freewheel along a closed loop between the inductor and the diode, while the switching unit is turned off, and supply the freewheeling current to the resonator, while the switching unit is turned on.

In yet another general aspect, an apparatus includes a resonator configured to transmit power, and a power supply configured to supply power to the resonator. The apparatus further includes a switching unit configured to connect the resonator to the power supply, and disconnect the resonator from the power supply, and a resistor disposed between the power supply and the switching unit. The apparatus further includes a controller configured to control the switching unit based on voltage applied to the resistor.

The controller may be configured to turn off the switching unit to disconnect the resonator from the power supply in response to the voltage being greater than or equal to a predetermined voltage.

Other features and aspects will be apparent from the following detailed description, the drawings, and the claims.

Figure 1:
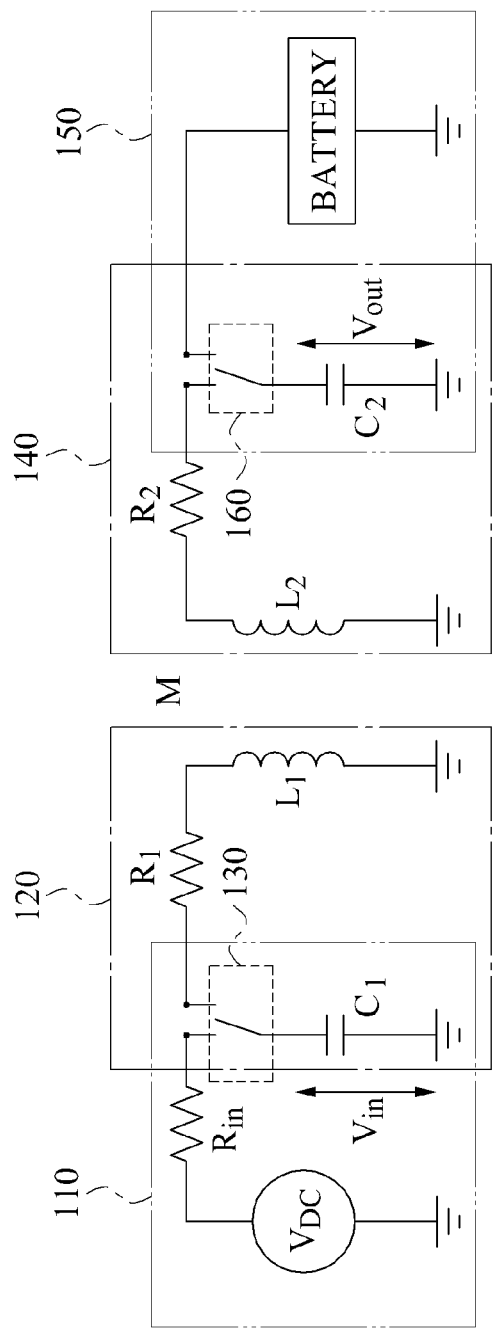
FIG. 1 is a circuit diagram illustrating an example of an equivalent circuit of a wireless power transmission system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be applied to various systems requiring wireless power. The wireless power transmission system may be used in a system enabling use of wireless power, for example, a mobile phone, a wireless television (TV), and/or other systems known to one of ordinary skill in the art. Additionally, the wireless power transmission system may be applicable in a bio-healthcare field, and may be used to remotely transmit power to a device inserted into a human body, or used to wirelessly transmit power to a bandage-shaped device for measurement of a heart rate.

The wireless power transmission system may also be applied to a device, such as, for example, a low-power sensor operating using a relatively small amount of power and with relatively low power consumption. Additionally, the wireless power transmission system may be used to remotely control an information storage device without a power source. The wireless power transmission system may be applied to a system configured to supply power to an information storage device to remotely operate the information storage device, and to wirelessly request information stored in the information storage device.

The wireless power transmission system may receive energy supplied from a power supply unit, and may store the energy in a source resonator, to generate a signal. The wireless power transmission system may induce the source resonator to self-resonate by powering off a switch that electrically connects the power supply unit to the source resonator. When a target resonator with the same resonant frequency as the self-resonating source resonator is disposed within a distance close enough to resonate with the source resonator, a mutual resonance phenomenon may occur between the source resonator and the target resonator. In examples herein, the source resonator may refer to a resonator that receives energy from a power supply unit, and the target resonator may refer to a resonator that receives energy from the source resonator due to the mutual resonance phenomenon. The wireless power transmission system may be defined as a resonator isolation (RI) system.

FIG. 1 illustrates an example of an equivalent circuit of a wireless power transmission system. FIG. 1 illustrates an example of an RI system corresponding to, for example, a capacitive charging (CC) scheme. Referring to FIG. 1, the wireless power transmission system includes a source-target structure including a source device and a target device. The wireless power transmission system includes a wireless power transmission apparatus corresponding to the source device, and a wireless power reception apparatus corresponding to the target device.

In more detail, the wireless power transmission apparatus includes a power input unit 110, a power transmitting unit 120, a switch unit 130, and a capacitor $C_1$. The power input unit 110 is physically-separated from the power transmitting unit 120 by the switch unit 130 and the capacitor $C_1$. The wireless power reception apparatus includes a receiving unit 140, a power output unit 150, a switch unit 160, and a capacitor $C_2$. The receiving unit 140 is physically-separated from the power output unit 150 by the switch unit 160 and the capacitor $C_2$.

The power input unit 110 stores energy in the capacitor $C_1$, using a power supply unit generating an input voltage $V_{DC}$. The switch unit 130 connects the capacitor $C_1$ to the power input unit 110, while the energy is transmitted from the power supply unit and stored in the capacitor $C_1$. To discharge the stored energy, the switch unit 130 disconnects the capacitor $C_1$ from the power input unit 110, and connects the capacitor $C_1$ to the power transmitting unit 120. The switch unit 130 prevents the capacitor $C_1$ from being connected to the power input unit 110 and the power transmitting unit 120 at the same time.

The power transmitting unit 120 transfers electromagnetic energy to the receiving unit 140, through mutual resonance. In more detail, the power transmitting unit 120 transfers the electromagnetic energy through the mutual resonance between a transmission coil $L_1$ of the power transmitting unit 120 and a reception coil $L_2$ of the receiving unit 140. The level of the mutual resonance between the transmission coil $L_1$ and the reception coil $L_2$ is affected by mutual inductance M between the transmission coil $L_1$ and the reception coil $L_2$.

The power input unit 110 includes the power supply unit generating the input voltage $V_{DC}$, an internal resistor $R_{in}$, and the capacitor $C_1$, and the power transmitting unit 120 includes a resistor $R_1$, the transmission coil $L_1$, and the capacitor $C_1$ that form the source resonator. Additionally, the switch unit 130 includes at least one switch. For example, the switch may include an active element enabling an on/off function. In FIG. 1, $R_1$, $L_1$, and $C_1$ represent a resistance, an inductance, and a capacitance, respectively, of the source resonator. A voltage applied to the capacitor $C_1$ among the input voltage $V_{DC}$ is represented by $V_{in}$.

In FIG. 1, the receiving unit 140 receives the electromagnetic energy from the power transmitting unit 120, and stores the received electromagnetic energy in the capacitor $C_2$. The switch unit 160 connects the capacitor $C_2$ to the receiving unit 140, while the electromagnetic energy is transmitted from the power transmitting unit 120 and stored in the capacitor $C_2$. To discharge the stored energy, the switch unit 160 disconnects the capacitor $C_2$ from the receiving unit 140, and connects the capacitor $C_2$ to the power output unit 150. The power output unit 150 transfers the energy stored in the capacitor $C_2$ to a load, for example, a battery. The switch unit 160 prevents the capacitor $C_2$ from being connected to the receiving unit 140 and the power output unit 150 at the same time.

In more detail, the receiving unit 140 receives the electromagnetic energy through the mutual resonance between the reception coil $L_2$ of the receiving unit 140 and the transmission coil $L_1$ of the power transmitting unit 120. The receiving unit 140 charges the capacitor $C_2$ connected to the reception coil $L_2$, with the received electromagnetic energy. The power output unit 150 transfers the energy used to charge the capacitor $C_2$ to the load, for example, the battery. As another example, the power output unit 150 may transfer the energy to a target device requiring power, instead of to the battery.

The receiving unit 140 includes a resistor $R_2$, the reception coil $L_2$, and the capacitor $C_2$ that form a target resonator, and the power output unit 150 includes the capacitor $C_2$ and the battery. The switch unit 160 includes at least one switch. In FIG. 1, $R_2$, $L_2$, and $C_2$ represent a resistance, an inductance, and a capacitance, respectively, of the target resonator. A voltage applied to the capacitor $C_2$ among the electromagnetic energy received by the reception coil $L_2$ is represented by $V_{out}$.

The RI system enables power to be transmitted in an example in which the power input unit 110 is physically separated from the power transmitting unit 120, and the receiving unit 140 is physically separated from the power output unit 150. The RI system may have various differences in comparison to a conventional power transmission system using impedance matching. The RI system does not need a power amplifier because power may be supplied from a direct current (DC) source (e.g., the power supply unit generating the input voltage $V_{DC}$) directly to the source resonator. Further, the RI system does not require a rectifying operation of a rectifier because energy is captured from energy used to charge the capacitor $C_2$ of the wireless power reception apparatus. Further, a transmission efficiency is not sensitive to a change in a distance between the wireless power transmission apparatus and the wireless power reception apparatus because there is no need to perform impedance matching. Additionally, the RI system may be easily extended from the wireless power transmission system including a single transmission apparatus and a single reception apparatus to a wireless power transmission system including a plurality of transmission apparatuses and a plurality of reception apparatuses.

Figure 2:
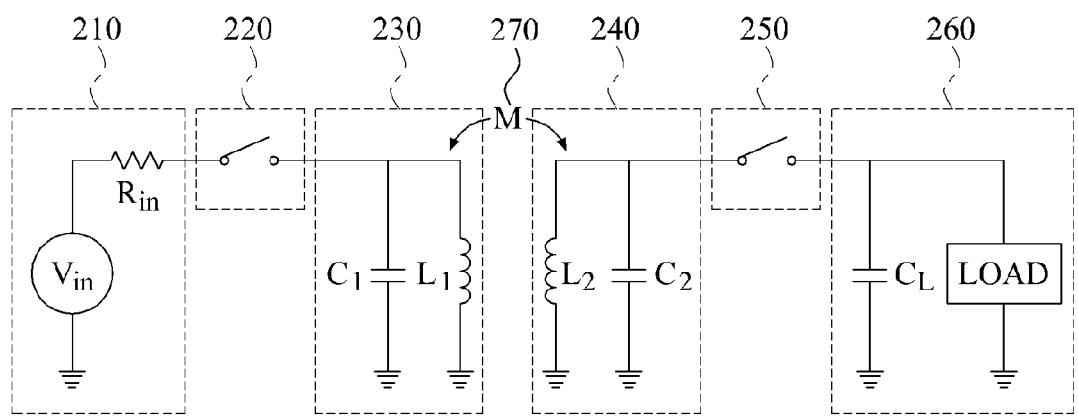
FIG. 2 is a circuit diagram illustrating another example of an equivalent circuit of a wireless power transmission system.

FIG. 2 illustrates another example of an equivalent circuit of a wireless power transmission system. FIG. 2 illustrates another example of an RI system corresponding to, for example, an inductive charging (IC) scheme.

Referring to FIG. 2, the wireless power transmission system includes a source-target structure including a source device and a target device. The wireless power transmission system includes a wireless power transmission apparatus corresponding to the source device, and a wireless power reception apparatus corresponding to the target device.

In more detail, the wireless power transmission apparatus includes a power charging unit 210, a control unit 220, and a transmitting unit 230. The power charging unit 210 is physically separated from the transmitting unit 230 by the control unit 220. The wireless power reception apparatus includes a charging unit 240, a control unit 250, and a power output unit 260. The charging unit 240 is physically separated from the power output unit 260 by the control unit 250.

In this example, the power charging unit 210 includes a power supply unit $V_{in}$ and an internal resistor $R_{in}$. The transmitting unit 230 includes a capacitor $C_1$ and an inductor $L_1$. In FIG. 2, the capacitor $C_1$ and the inductor $L_1$ are referred to as a source resonator. In this example, the source resonator functions as the transmitting unit 230. The transmitting unit 230 transmits energy stored in the source resonator to a target resonator, through mutual resonance M 270 between the source resonator and the target resonator.

The control unit 220 includes a switch, and turns on (e.g., closes) the switch to enable power to be supplied from the power charging unit 210 to the transmitting unit 230. In more detail, a voltage from the power supply unit $V_{in}$ is applied to the capacitor $C_1$, and a current is applied to the inductor $L_1$. For example, when the source resonator reaches a steady state due to the voltage applied from the power supply unit $V_{in}$, the voltage applied to the capacitor $C_1$ may include a value of '0', and the current flowing in the inductor $L_1$ may include a value of '$V_{in}/R_{in}$'. In the steady state, the source resonator may be charged with power, using the current applied to the inductor $L_1$.

When the power used to charge the source resonator in the steady state reaches a predetermined value or a maximum value, the control unit 220 turns off (e.g., opens) the switch. The control unit 220 may set information on the predetermined value. By turning off the switch, the control unit 220 separates the power charging unit 210 from the transmitting unit 230. When the power charging unit 210 is separated from the transmitting unit 230, the source resonator starts self-resonating between the capacitor $C_1$ and the inductor $L_1$. Energy stored in the source resonator is transferred to the target resonator, through the mutual resonance M 270 between the source resonator and the target resonator. A resonant frequency $f_1$ of the source resonator may be the same as a resonant frequency $f_2$ of the target resonator. Additionally, a value of the resonant frequency $f_1$, and a value of resonant frequency $f_2$, may be determined based on the following equations.

$$f_1 = \frac{1}{2\pi\sqrt{L_1 C_1}},\ f_2 = \frac{1}{2\pi\sqrt{L_2 C_2}} \qquad (1)$$

In Equations (1), $L_1$ denotes an inductance of the inductor $L_1$, $C_1$ denotes a capacitance of the capacitor $C_1$, $L_2$ denotes an inductance of an inductor $L_2$ of the target resonator, and $C_2$ denotes a capacitance of a capacitor $C_2$ of the target resonator.

In this example, the charging unit 240 includes the capacitor $C_2$ and the inductor $L_2$. In FIG. 2, the capacitor $C_2$ and the inductor $L_2$ are referred to as the target resonator. In this example, the target resonator functions as the charging unit 240. The charging unit 240 receives the energy stored in the source resonator via the target resonator, through the mutual resonance M 270 between the source resonator and the target resonator. The power output unit 260 includes a load and a capacitor $C_L$.

The control unit 250 includes a switch, and turns off (e.g., opens) the switch. By turning off the switch, the control unit 250 separates the charging unit 240 from the power output unit 260. During the mutual resonance M 270 between the source resonator and the target resonator, the source resonator is separated from the power supply unit $V_{in}$ by the control unit 220 including the switch being open, and the target resonator is separated from the load and the capacitor $C_L$ by the control unit 250 including the switch being open. The energy stored in the source resonator is transferred to the target resonator, through the mutual resonance M 270. In more detail, the energy stored in the source resonator charges the capacitor $C_2$ and the inductor $L_2$ of the charging unit 240, through the mutual resonance M 270. The resonant frequency $f_1$ of the source resonator may be the same as the resonant frequency $f_2$ of the target resonator.

When the energy used to charge the target resonator reaches a predetermined value or a maximum value, the control unit 250 turns on (e.g., closes) the switch. The control unit 250 may set information on the predetermined value. By turning on the switch, the control unit 250 connects the capacitor $C_L$ to the charging unit 240, and the resonant frequency of the target resonator is changed. A value of the changed resonant frequency $f_2$ of the target resonator may be determined based on the following equation.

$$f_2' = \frac{1}{2\pi\sqrt{L_2(C_2 + C_L)}} \quad (2)$$

In Equation (2), $C_L$ denotes a capacitance of the capacitor $C_L$.

Accordingly, the mutual resonance M 270 between the source resonator and the target resonator is terminated. For example, when the changed resonant frequency $f_2$ is much smaller than the resonant frequency $f_2$ based on a Q-factor of the target resonator, the mutual resonance M 270 is removed. Additionally, the charging unit 240 transfers power used to charge the capacitor $C_2$ and the inductor $L_2$ to the power output unit 260, which transfers the power to a load. For example, the power output unit 260 may transfer the power to the load, using a scheme suitable for the load. For example, the power output unit 260 may regulate voltage to rated voltage that is needed by the load, and may transfer power to the load based on the regulated voltage.

When the energy used to charge the target resonator is less than a predetermined value, the control unit 250 turns off the switch. The charging unit 240 may recharge the target resonator with energy using the mutual resonance M 270 between the source resonator and the target resonator.

During the mutual resonance M 270 between the source resonator and the target resonator, the switch of the control unit 250 is not connected between the charging unit 240 and the power output unit 260. Accordingly, it is possible to prevent transmission efficiency from being reduced due to a connection to the switch.

A scheme of controlling a point in time of capturing energy stored in a target resonator of FIG. 2 may be performed more easily than a scheme of transferring energy stored in a capacitor of FIG. 1. In the scheme of transferring the energy stored in a capacitor, only the energy in the capacitor is captured. However, in a scheme of changing a resonant frequency of the target resonator and capturing the energy stored in the target resonator, the energy stored in an inductor and a capacitor of the target resonator is captured. Accordingly, a degree of freedom for the point in time of capturing the energy may be improved.

To transmit power or data, a transmission apparatus in an RI system may repeatedly charge a source resonator with energy and discharge energy through a connection to a switch. In various examples herein, a single charge and discharge of energy may be referred as a single symbol. To receive energy or data from the transmission apparatus, a reception apparatus in the RI system may operate a switch of the reception apparatus based on an operation period of a switch of the transmission apparatus that repeatedly performs charging and discharging.

To receive power or data from the transmission apparatus without an error, the reception apparatus may need to know when the switch of the transmission apparatus is powered off, when the switch of the transmission apparatus is powered on, when a mutual resonance is started, and when energy stored in the target resonator includes a peak value. An method of acquiring information regarding an on/off time of the switch of the transmission apparatus, and matching an on/off time of the switch of the reception apparatus to the acquired information, may be referred as a time synchronization.

To transfer information, the RI system may use mutual resonance between a source resonator and a target resonator. For example, the transmission apparatus may switch between states in which mutual resonance occurs and does not occur for a predetermined time interval, through an operation of supplying and not supplying energy from a power supply to the source resonator for the predetermined time interval. In this example, the transmission apparatus may switch the mutual resonance by switching a connection between the source resonator and the power supply. The transmission apparatus may assign information to each of the states. For example, the transmission apparatus may assign a bit "1" to the state in which the mutual resonance occurs, and assign a bit "0" to the state in which the mutual resonance does not occur. The predetermined time interval may be defined, for example, as a single symbol duration.

The reception apparatus may switch between states in which mutual resonance occurs and does not occur, through an operation of tuning and detuning a resonant frequency of the target resonator to and from a resonant frequency of the source resonator, for the predetermined time interval. In this example, the reception apparatus may assign information to each of the states. For example, the reception apparatus may assign a bit "1" to the state in which the mutual resonance occurs, and assign a bit "0" to the state in which the mutual resonance does not occur.

In a scheme of transferring information in a symbol unit, symbols may need to be synchronized first. To synchronize symbols, the reception apparatus or the transmission apparatus may perform synchronization matching. When the synchronization matching is performed, data may be bidirectionally transmitted between the transmission apparatus and the reception apparatus by a protocol that is set in advance.

Figure 3:
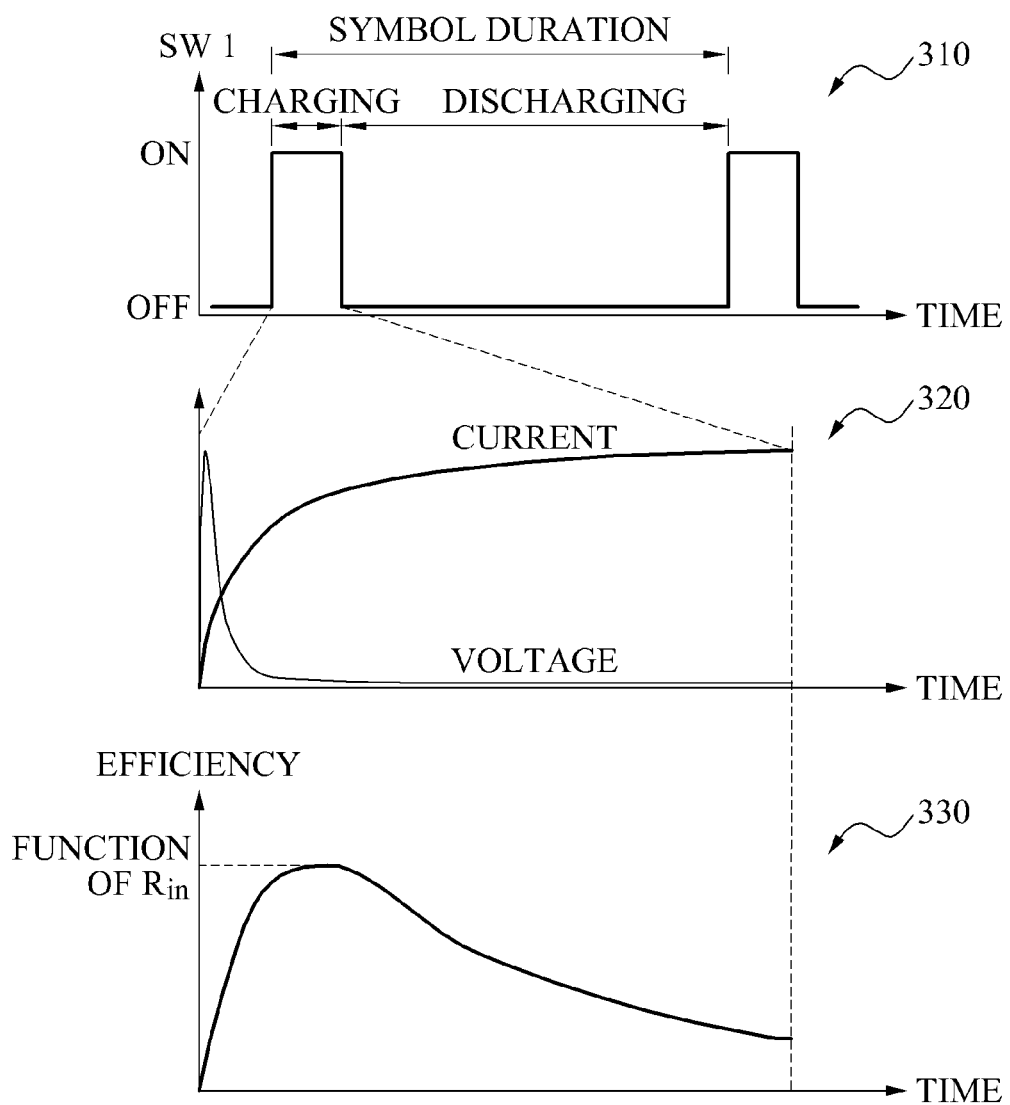
FIG. 3 illustrates an example of a charging efficiency according to an operation of a switch in a wireless power transmission apparatus.

FIG. 3 illustrates an example of a charging efficiency according to an operation of a switch SW 1 in a wireless power transmission apparatus. A series of graphs provided in FIG. 3 will be described based on an RI system corresponding to an IC scheme.

Referring to FIG. 3, a graph 310 illustrates an energy charging time interval according to a turning on and off of the switch SW 1 in the wireless power transmission apparatus. The wireless power transmission apparatus may transmit energy to a wireless power reception apparatus by repeatedly performing charging and discharging. A single charging and discharging of energy corresponds to a single symbol duration. When the switch of the wireless power transmission apparatus is turned on, a source resonator may be charged with energy. When the switch of the wireless power transmission apparatus is turned off, the energy in the source resonator may be discharged.

A graph 320 illustrates an amount of current and an amount of voltage over time during the energy charging time interval of the graph 310. When charging is initiated, voltage at the source resonator of the wireless power transmission apparatus decreases sharply. When the source resonator reaches a steady state, voltage applied to a capacitor of the source resonator may have a value of "0". When charging is initiated, current at the source resonator of the wireless power transmission apparatus increases sharply. When the source resonator reaches the steady state, current flowing in an inductor of the source resonator may reach a predetermined value, for example, $I_L = V_{in}/R_{in}$. In the steady state, the source resonator may be charged with energy of $LI_L^2/2$ through the current applied to the inductor. In this example, L denotes an inductance of the inductor of the source resonator.

A graph 330 illustrates an energy charging efficiency according to a function of an input resistor $R_{in}$ over time during the energy charging time interval of the graph 310. When energy charging is initiated, the energy charging efficiency according to the function of the input resistor $R_{in}$ increases. When the source resonator reaches a steady state over time, an amount of energy used to charge the source resonator may not increase. In the steady state, current may continuously flow through the input resistor $R_{in}$, and thus, loss of power may occur. The energy charging efficiency according to the function of the input resistor $R_{in}$ reaches a peak, and then decreases gradually.

Referring to the graphs 310 through 330, the energy charging efficiency may be increased by reducing the function of the input resistor $R_{in}$, by reducing a length of the energy charging time interval, or by precisely controlling the switch of the wireless power transmission apparatus.

FIGS. 4A through 4D illustrate examples of a wireless power transmission apparatus for high efficiency energy charging. FIGS. 4A through 4D illustrate the examples of the wireless power transmission apparatus using current sensing.

Figure 4A:
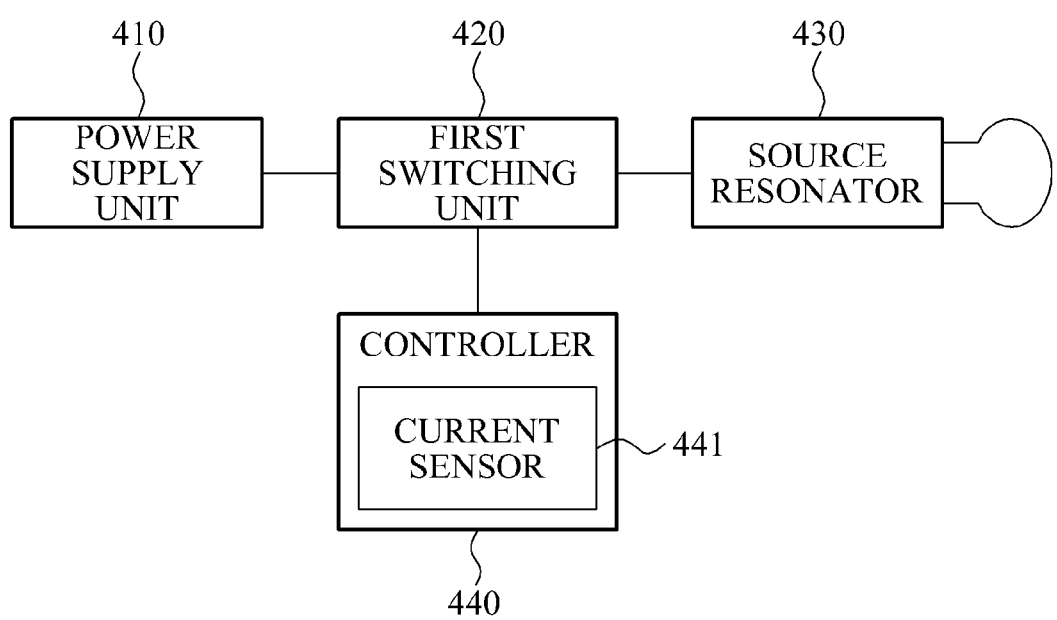
FIGS. 4A through 4D are diagrams illustrating examples of a wireless power transmission apparatus for high efficiency energy charging.

Referring to FIG. 4A, the example of the wireless power transmission apparatus includes a power supply unit 410, a first switching unit 420, a source resonator 430, and a controller 440. The controller 440 includes a current sensor 441.

The power supply unit 410 supplies power to the source resonator 430. The power supply unit 410 may include a DC voltage source or a DC current source. The power supply unit 410 supplies power to the source resonator 430 when the power supply unit 410 is connected to the source resonator 430 through the first switching unit 420. The power supply unit 410 may include an input power supply and an input resistor.

The first switching unit 420 connects the power supply unit 410 to the source resonator 430. The first switching unit 420 is turned on or off under control of the controller 440. When the first switching unit 420 is turned on, the power supply unit 410 is connected to the source resonator 430. When the first switching unit 420 is turned off, the power supply unit 410 is disconnected from the source resonator 430.

The source resonator 430 transmits power to a wireless power reception apparatus through mutual resonance with a target resonator of the wireless power reception apparatus.

The first switching unit 420 may include a transistor disposed between the power supply unit 410 and the source resonator 430, and a diode connected in series to the transistor. The diode may be disposed at a front end or a rear end of the transistor. The transistor may include a complementary metal oxide semiconductor (CMOS), an N-channel metal oxide semiconductor (NMOS), or a P-channel metal oxide semiconductor (PMOS).

The transistor of the first switching unit 420 may connect the power supply unit 410 to the source resonator 430, and disconnect the power supply unit 410 from the source resonator 430, based on a result of comparing a value of a control signal received from the controller 440 to a reference value. Depending on a type of the transistor, the first switching unit 420 may connect the power supply unit 410 to the source resonator 430 when the value of the control signal is less than the reference value, or when the value of the control signal is greater than or equal to the reference value. In addition, depending on the type of the transistor, the first switching unit 420 may disconnect the power supply unit 410 from the source resonator 430 when the value of the control signal is greater than or equal to the reference value, or when the value of the control signal is less than the reference value.

When the first switching unit 420 is turned on, the transistor and the diode may pass a DC signal of the power supply unit 410. When the first switching unit 420 is turned off, the transistor and the diode may block an inflow of an alternating current (AC) signal from the source resonator 430.

The controller 440 controls the first switching unit 420 based on an amount of current flowing into the source resonator 430. The controller 440 includes the current sensor 441 configured to sense the amount of the current flowing into the source resonator 430.

When the input resistor is set to have a relatively low resistance, an amount of power to be consumed by the input resistor may decrease, and an energy charging efficiency may increase. When the input resistor has a resistance lower than a threshold value, current greater than a threshold current that can flow into the source resonator 430 may be applied to the source resonator 430. Accordingly, the source resonator 430 may not perform a normal operation. For the energy charging efficiency, the wireless power transmission apparatus may set the input resistor to have a resistance lower than the threshold value, thereby enabling a relatively great amount of current to flow into the source resonator 430. In this example, the current sensor 441 senses the amount of the current flowing into the source resonator 430, and when the amount of the current flowing into the source resonator 430 is greater than or equal to an amount of predetermined target current for the source resonator 430, the controller 440 turns off the first switching unit 420. Since current less than the amount of the predetermined target current may flow into the source resonator 430, the wireless power transmission apparatus may increase the energy charging efficiency while operating the source resonator 430 normally.

The current sensor 441 may sense the amount of the current flowing into the source resonator 430, using voltage applied to the input resistor. In addition, the current sensor 441 may sense the amount of the current flowing into the source resonator 430, using current mirrored from current flowing in the first switching unit 420. A further description will be provided with reference to FIGS. 4B through 4D.

The controller 440 generates the control signal, and controls a period and an amplitude of the control signal. The controller 440 may control the amplitude of the control signal to be in a size to be used in the connecting or the disconnecting performed by the transistor. For example, when the transistor of the first switching unit 420 is of a type of a metal oxide semiconductor (MOS), the controller 440 may adjust an amplitude of voltage to be applied to a gate of the MOS, thereby adjusting an amount of power to be transferred from the power supply unit 410 to the source resonator 430.

The controller 440 controls an operation of the first switching unit 420 based on the amount of the current flowing into the source resonator 430 that is sensed by the current sensor 441. The controller 440 may transmit an ON signal to the first switching unit 420 to turn on the first switching unit 420. In this example, the controller 440 may receive an external digital signal, and transmit the ON signal to the first switching unit 420 in response to the receipt of the digital signal.

When the sensed amount of the current is greater than or equal to the amount of the predetermined target current, the controller 440 turns off the first switching unit 420. For example, if the transistor of the first switching unit 420 is a PMOS, and the amount of the current sensed by the current sensor 441 is greater than or equal to the amount of the predetermined target current, the controller 440 may apply, to the transistor of the first switching unit 420, a control signal greater than a difference between voltage applied to a source of the PMOS and threshold voltage of the PMOS. Accordingly, the first switching unit 420 may disconnect the power supply unit 410 from the source resonator 430.

When the sensed amount of the current is less than or equal to an amount of first predetermined threshold current, the controller 440 may turn on the first switching unit 420. When the sensed amount of the current is greater than or equal to an amount of second predetermined threshold current, the controller 440 may turn off the first switching unit 420. In this example, the amount of the second predetermined threshold current may be the same as the amount of the predetermined target current. For example, if the amount of the first predetermined threshold current is set to 0.1 amperes (A), and the amount of the second predetermined threshold current is set to 1 A, the controller 440 may turn on the first switching unit 420 when the sensed amount of the current is 0.01 A. When the sensed amount of the current is 1 A, the controller 440 may turn off the first switching unit 420.

Figure 4B:
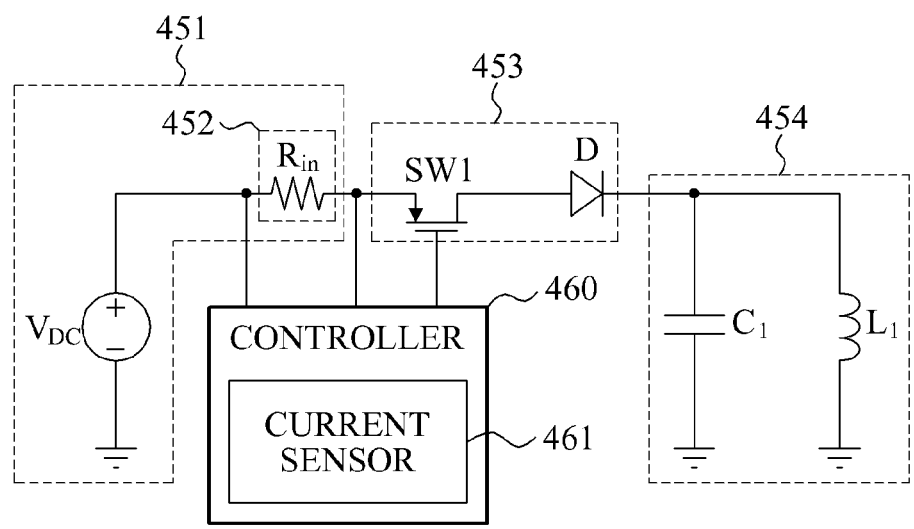
Figure 4C:
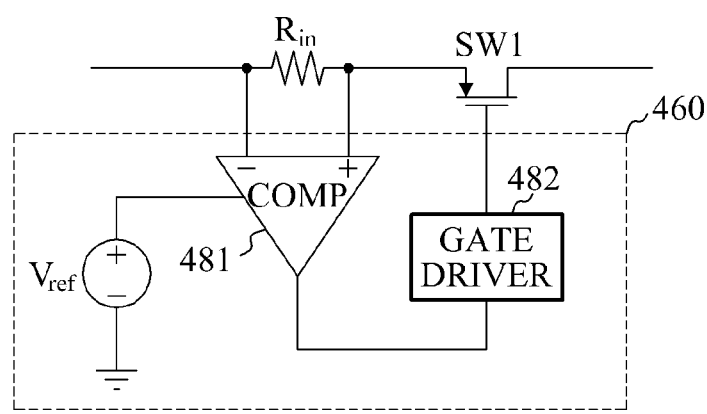

FIGS. 4B and 4C illustrate the other example of the wireless power transmission apparatus of FIG. 4A. In the other example of the wireless power transmission apparatus of FIGS. 4B and 4C, a current sensor may sense an amount of current flowing into a source resonator, using voltage applied to an input resistor.

Referring to 4B, the other example of the wireless power transmission apparatus includes a power supply unit 451, a first switching unit 453, a source resonator 454, and a controller 460. The power supply unit 451 includes an input resistor 452. In this example, the input resistor 452 may have a resistance sufficiently low enough for an amount of current greater than an amount of predetermined target current to flow through.

The first switching unit 453 includes a transistor SW1 disposed between the power supply unit 451 and the source resonator 454, and a diode D connected in series to the transistor. The diode may be disposed at a front end or a rear end of the transistor. The transistor may include a complementary metal oxide semiconductor (CMOS), an N-channel metal oxide semiconductor (NMOS), or a P-channel metal oxide semiconductor (PMOS).

The controller 460 includes a current sensor 461. The controller 460 is connected to the transistor of the first switching unit 453 and both ends of the input resistor 452. Accordingly, the current sensor 461 senses an amount of current applied to the source resonator 454, using voltage applied to the input resistor 452, and the controller 460 controls a turning on and off of the first switching unit 453 based on the sensed amount of the current.

FIG. 4C illustrates a detailed example of the controller 460 in the wireless power transmission apparatus of FIG. 4B. Referring to FIG. 4C, the controller 460 includes a comparator 481 and a gate driver 482. The comparator 481 may correspond to the current sensor 461 of FIG. 4B. The comparator 481 is connected to both ends of an input resistor, e.g., the input resistor 452 of FIG. 4B. Accordingly, the comparator 481 identifies voltage applied to the input resistor. The comparator 481 compares the voltage applied to the input resistor to predetermined reference voltage $V_{ref}$. The predetermined reference voltage may correspond to an amount of predetermined target current. The controller 460 controls, through the gate driver 482, a turning on and off of a first switching unit (e.g., the first switching unit 453 of FIG. 4B) based on a result of the comparing performed by the comparator 481.

For example, if a transistor (e.g., the transistor SW1 of FIG. 4B) of the first switching unit is a PMOS, and the controller 460 receives an external digital signal, the controller 460 may apply, through the gate driver 482 to the transistor of the first switching unit, a control signal less than or equal to a difference between voltage applied to a source of the PMOS and threshold voltage of the PMOS. Accordingly, the first switching unit may be turned on.

As a result of the comparing performed by the comparator 481, when the voltage applied to the input resistor is greater than or equal to the predetermined reference voltage, the controller 460 may apply, through the gate driver 482 to the transistor of the first switching unit, a control signal greater than the difference between the voltage applied to the source of the PMOS and the threshold voltage of the PMOS. Accordingly, the first switching unit may be turned off.

Figure 4D:
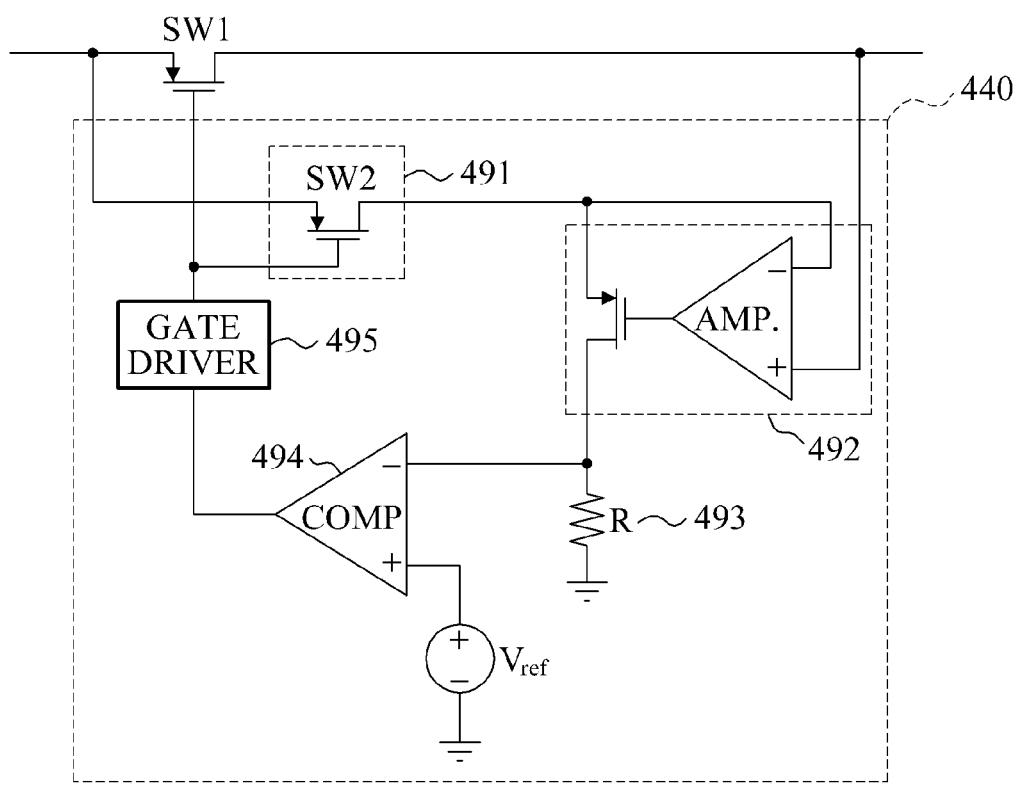

FIG. 4D illustrates a detailed example of the controller 440 of FIG. 4A. Referring to FIG. 4D, the controller 440 includes a second switching unit 491, an amplifier and transistor 492, a variable resistor 493 (R), a comparator 494, and a gate driver 495. The second switching unit 491, the amplifier and transistor 492, the variable resistor 493, and the comparator 494 may correspond to the current sensor 441 of FIG. 4A.

The second switching unit 491 includes a transistor SW2. The transistor of the second switching unit 491 may be smaller than a transistor SW1 of a first switching unit, e.g., the transistor of the first switching unit 420 of FIG. 4A. In addition, gate-source voltage $V_{gs}$ and drain-source voltage $V_{ds}$ of the transistor of the second switching unit 491 is equal to gate-source voltage $V_{gs}$ and drain-source voltage $V_{ds}$ of the transistor of the first switching unit. Accordingly, current flowing in the second switching unit 491 is current mirrored from current flowing in the first switching unit, and an amount of the current flowing in the second switching unit 491 may be greater than an amount of the current flowing in the first switching unit by a factor of 1/N. For example, the transistor of the second switching unit 491 may be a miniature mirror transistor of the transistor of the first switching unit.

The second switching unit 491 controls a flow of current mirrored from current flowing into a source resonator, e.g., the source resonator 430 of FIG. 4A. The mirrored current flowing through the second switching unit 491 flows into the amplifier and transistor 492, and the amplifier and transistor 492 applies voltage corresponding to the mirrored current to the variable resistor 493. The comparator 494 compares the voltage corresponding to the mirrored current to predetermined reference voltage $V_{ref}$. The predetermined reference voltage may correspond to an amount of predetermined target current. The controller 440 controls, through the gate driver 495, a turning on and off of the first switching unit based on a result of the comparing performed by the comparator 494.

If the transistor of the first switching unit is a PMOS, and the controller 440 receives an external digital signal, the controller 440 may apply, through the gate driver 495 to the transistor of the first switching unit, a control signal less than or equal to a difference between voltage applied to a source of the PMOS and threshold voltage of the PMOS. Accordingly, the first switching unit may be turned on.

As a result of the comparing performed by the comparator 494, when voltage applied to an input resistor is greater than or equal to the predetermined reference voltage, the controller 440 may apply, through the gate driver 495 to the transistor of the first switching unit, a control signal greater than the difference between the voltage applied to the source of the PMOS and the threshold voltage of the PMOS. Accordingly, the first switching unit may be turned off.

The controller 440 also controls, through the gate driver 495, a turning on and off of the second switching unit 491 based on the result of the comparing performed by the comparator 494.

Figure 5A:
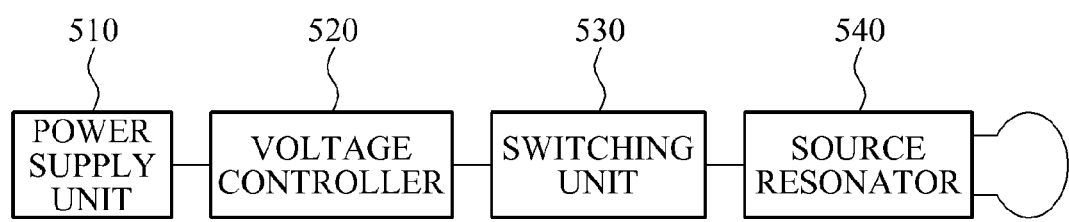
FIGS. 5A through 5B are diagrams illustrating other examples of a wireless power transmission apparatus for high efficiency energy charging.
Figure 5B:
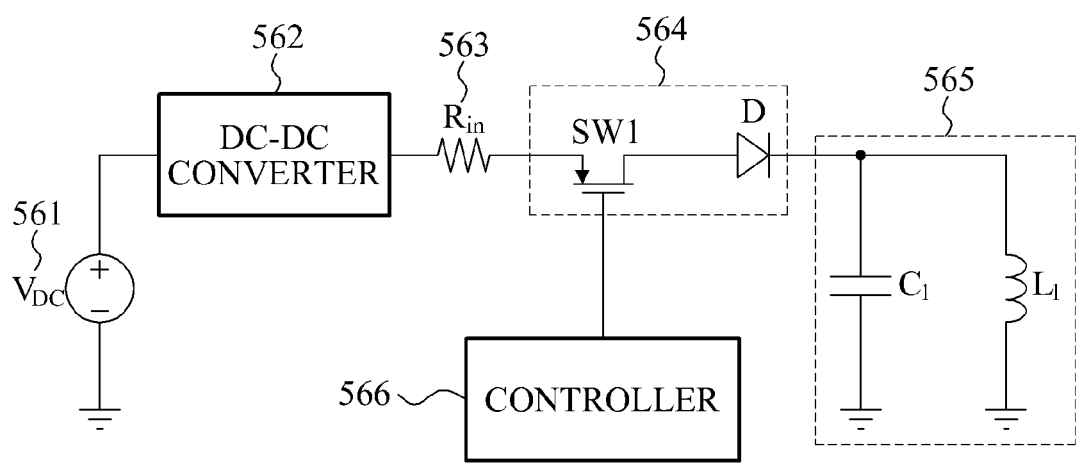

FIGS. 5A through 5B illustrate other examples of a wireless power transmission apparatus for high efficiency energy charging. Referring to FIG. 5A, the example of the wireless power transmission apparatus includes a power supply unit 510, a voltage controller 520, a switching unit 530, and a source resonator 540. Although not shown in FIG. 5A, the wireless power transmission apparatus may further include a controller.

The power supply unit 510 supplies power to the source resonator 540. The power supply unit 510 may include a DC voltage source or a DC current source. The power supply unit 510 supplies power when the power supply unit 510 is connected to the source resonator 540 through the switching unit 530. The power supply unit 510 may include an input power supply and an input resistor.

The source resonator 540 transmits power to a wireless power reception apparatus through mutual resonance with a target resonator of the wireless power reception apparatus.

The switching unit 530 connects the power supply unit 510 to the source resonator 540, and disconnects the power supply unit 510 from the source resonator 540. The switching unit 530 may include a transistor disposed between the power supply unit 510 and the source resonator 540, and a diode connected in series to the transistor.

The controller may compare an amount of current flowing into the source resonator 540 to an amount of predetermined target current, and control the switching unit 530 based on a result of the comparing.

Voltage may be applied by the input power supply to the input resistor included in the power supply unit 510, and the current flowing into the source resonator 540 may flow through the input resistor. Accordingly, power may be consumed by the input resistor, and thus, an energy charging efficiency may decrease.

The voltage controller 520 controls the voltage applied to the input resistor. In detail, the voltage controller 520 is disposed at a rear of the input power supply. In addition, the voltage controller 520 may include a DC-to-DC (DC-DC) converter. The voltage controller 520 may adjust the voltage applied to the input resistor based on current or voltage supplied by the input power supply. Accordingly, an amount of the power consumed by the input resistor may decrease, and thus, the energy charging efficiency may increase.

FIG. 5B illustrates the detailed example of the wireless power transmission apparatus of FIG. 5A. Referring to FIG. 5B, the detailed example of the wireless power transmission apparatus includes an input power supply 561, a DC-DC converter 562, an input resistor 563, a switching unit 564, a source resonator 565, and a controller 566.

The input power supply 561 supplies power to the source resonator 565 through the input resistor 563. When current flowing into the source resonator 565 flows through the input resistor 563, power may be consumed by the input resistor 563.

The DC-DC converter 562 adjusts voltage of the input power supply 561. In addition, the DC-DC converter 562 may correspond to the voltage controller 520 of FIG. 5A.

The DC-DC converter 562 is disposed at a rear of the input power supply 561. Although, in FIG. 5B, the DC-DC converter 562 is disposed between the input power supply 561 and the input resistor 563, the DC-DC converter 562 may be disposed at a rear of the input resistor 563, or disposed to be in parallel with the input resistor 563.

The DC-DC converter 562 adjusts voltage applied to the input resistor 563, thereby adjusting an amount of the current flowing into the source resonator 565. Accordingly, the amount of the current adjusted by the DC-DC converter 562 flows into the source resonator 565.

In addition, the DC-DC converter 562 adjusts an amount of power to be consumed by the input resistor 563. Accordingly, the DC-DC converter 562 applies, to the input resistor 563, the voltage to increase an energy charging efficiency. For example, the DC-DC converter 562 may adjust the voltage applied to the input resistor 563 for target current to flow through the input resistor 563. Accordingly, the target current may flow into the source resonator 565 within a relatively short time, whereby the energy charging efficiency may increase. As another example, the DC-DC converter 562 may apply voltage lower than voltage supplied from the input power supply 561, to the input resistor 563 to reduce the amount of the power to be consumed by the input resistor 563, whereby the energy charging efficiency may increase.

The controller 566 controls the switching unit 564 based on a result of comparing the amount of the current flowing into the source resonator 565 to an amount of predetermined target current. For example, when the amount of the current flowing into the source resonator 565 is greater than or equal to the amount of the predetermined target current, the controller 566 may turn off the switching unit 564. In addition, when the controller 566 receives an external digital signal, the controller 566 may transmit an ON signal to the switching unit 564 to turn on the switching unit 564.

Figure 6A:
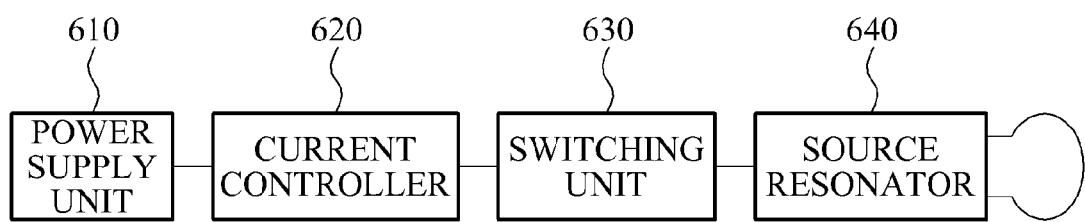
FIGS. 6A through 6B are diagrams illustrating still other examples of a wireless power transmission apparatus for high efficiency energy charging.
Figure 6B:
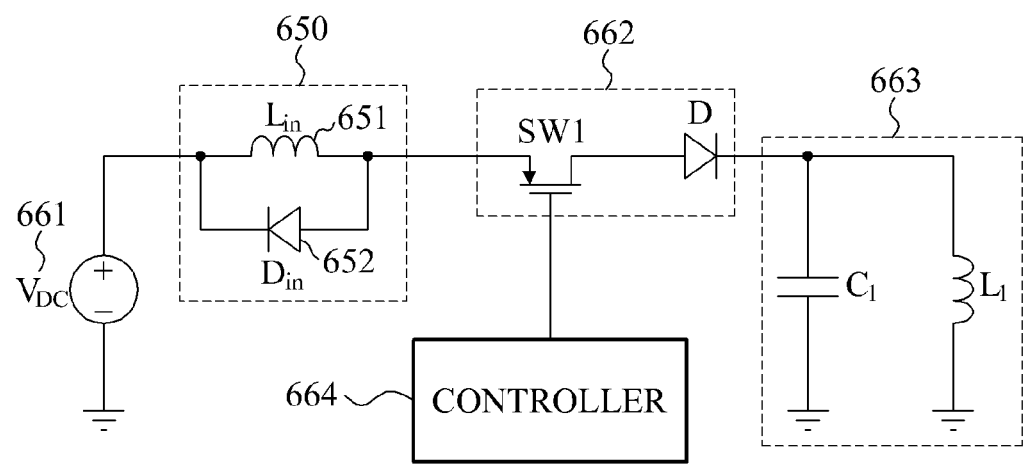

FIGS. 6A through 6B illustrate still other examples of a wireless power transmission apparatus for high efficiency energy charging. Referring to FIG. 6A, the example of the wireless power transmission apparatus includes a power supply unit 610, a current controller 620, a switching unit 630, and a source resonator 640. Although not shown in FIG. 6A, the wireless power transmission apparatus may further include a controller.

The power supply unit 610 supplies power to the source resonator 640. The power supply unit 610 may include a DC voltage source or a DC current source. The power supply unit 610 supplies power when the power supply unit 610 is connected to the source resonator 640 through the switching unit 630. The power supply unit 610 may include an input power supply and an input resistor.

The source resonator 640 transmits power to a wireless power reception apparatus through mutual resonance with a target resonator of the wireless power reception apparatus.

The switching unit 630 connects the power supply unit 610 to the source resonator 640, and disconnects the power supply unit 610 from the source resonator 640. The switching unit 630 may include a transistor disposed between the power supply unit 610 and the source resonator 640, and a diode connected in series to the transistor.

The controller may compare an amount of current flowing into the source resonator 640 to an amount of predetermined target current, and control the switching unit 630 based on a result of the comparing.

The switching unit 630 maintains the connection between the power supply unit 610 and the source resonator 640 under control of the controller until the amount of the current flowing into the source resonator 640 is the same as the amount of the predetermined target current. Accordingly, current may flow through the input resistor until the amount of the current flowing into the source resonator 640 is the same as the amount of the predetermined target current, and thus, power may be consumed by the input resistor. By reducing an amount of time used until the current flowing into the source resonator 640 reaches the predetermined target current, an amount of power to be consumed by the input resistor while the switching unit 630 is turned on may decrease.

The current controller 620 controls the amount of the current flowing into the source resonator 640 based on a turning on and off of the switching unit 630. In detail, the current controller 620 may include an inductor disposed between the power supply unit 610 and the switching unit 630, and a diode connected in parallel to the inductor. While the switching unit 630 is turned off, the current controller 620 may control the current flowing into the source resonator 640 at a point in time at which the switching unit 630 is turned off to freewheel along a closed loop between the inductor and the diode. In addition, the current controller 620 may supply the freewheeling current to the source resonator 640, while the switching unit 630 is turned on. Accordingly, when the switching unit 630 is turned on, an inductor of the source resonator 640 may be charged more rapidly with the freewheeling current flowing in the inductor of the current controller 620, and a charging time may decrease, whereby the amount of the power to be consumed by the input resistor of the power supply unit 610 may decrease.

FIG. 6B illustrates the detailed example of the wireless power transmission apparatus of FIG. 6A. Referring to FIG. 6B, the detailed example of the wireless power transmission apparatus includes a power supply unit 661, a current controller 650, a switching unit 662, a source resonator 663, and a controller 664.

The power supply unit 661 supplies power to the source resonator 663 through the switching unit 662.

The controller 664 controls the switching unit 662 based on a result of comparing an amount of current flowing into the source resonator 663 to an amount of predetermined target current. For example, when the amount of the current flowing into the source resonator 663 is greater than or equal to the amount of the predetermined target current, the controller 664 turns off the switching unit 662. In addition, when the controller 664 receives an external digital signal, the controller 664 may transmit an ON signal to the switching unit 662 to turn on the switching unit 662.

The current controller 650 includes an inductor 651 $L_{in}$ disposed between the power supply unit 661 and the switching unit 662, and a diode 652 $D_{in}$ connected in parallel to the inductor 651. When the power supply unit 661 supplies power to the source resonator 663 such that the amount of the current flowing into the source resonator 663 is the same as the amount of the predetermined target current, the controller 664 controls the switching unit 662 to be turned off. At a time the switching unit 662 is turned off, an amount of current identical to the amount of the predetermined target current flows in the inductor 651 of the current controller 650. In this example, the current flowing in the inductor 651 flows in the diode 652 connected in parallel to the inductor 651, and freewheels along a closed loop between the inductor 651 and the diode 652. When the switching unit 662 is turned on, the current controller 650 supplies the freewheeling current flowing in the inductor 651 to the source resonator 663. Accordingly, the source resonator 663 may be charged rapidly, and the switching unit 662 may be turned off rapidly. As such, power consumption may decrease, and thus, an energy charging efficiency may increase.

Figure 7:
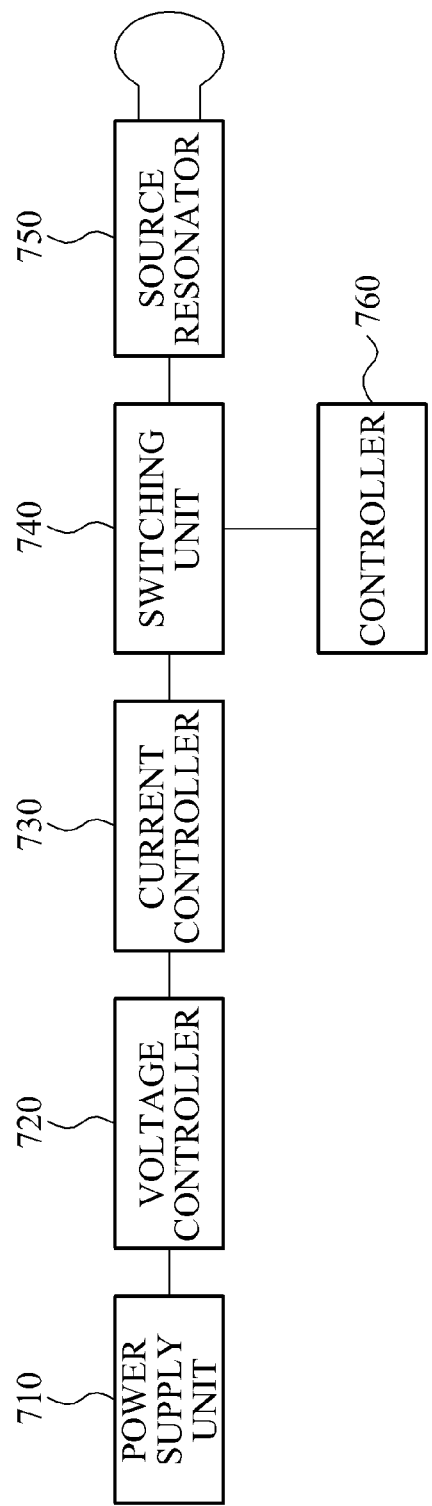
FIG. 7 is a block diagram illustrating yet another example of a wireless power transmission apparatus for high efficiency energy charging.

FIG. 7 illustrates yet another example of a wireless power transmission apparatus for high efficiency energy charging. The wireless power transmission apparatus described with reference to FIGS. 4A through 4D (hereinafter, the first wireless power transmission apparatus), the wireless power transmission apparatus described with reference to FIGS. 5A and 5B (hereinafter, the second wireless power transmission apparatus), and the wireless power transmission apparatus described with reference to FIGS. 6A and 6D (hereinafter, the third wireless power transmission apparatus) may be configured separately, or configured in a combination thereof. For example, the first wireless power transmission apparatus may be combined with the second wireless power transmission apparatus, and the second wireless power transmission apparatus may be combined with the third wireless power transmission apparatus. In addition, the first wireless power transmission apparatus may be combined with the third wireless power transmission apparatus, and the first wireless power transmission apparatus, the second wireless power transmission apparatus, and the third wireless power transmission apparatus may be combined into a single wireless power transmission apparatus as described herein.

Referring to FIG. 7, the wireless power transmission apparatus includes a power supply unit 710, a voltage controller 720, a current controller 730, a switching unit 740, a source resonator 750, and a controller 760. The power supply unit 710 supplies power to the source resonator 750. The power supply unit 710 may include an input resistor.

The voltage controller 720 controls voltage applied to the input resistor.

The current controller 730 controls current flowing into the source resonator 750, based on an operation of the switching unit 740.

The switching unit 740 connects the power supply unit 710 to the source resonator 750, and disconnects the power supply unit 710 from the source resonator 750.

The source resonator 750 transmits power to a wireless power reception apparatus through resonance with a target resonator of the wireless power reception apparatus.

The controller 760 controls the switching unit 740 based on an amount of current flowing into the source resonator 750. The descriptions provided with reference to FIGS. 1 through 6B may be applied to the wireless power transmission apparatus of FIG. 7, and thus, a duplicated description will be omitted here for conciseness.

The various apparatuses, units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus for high efficiency energy charging, the apparatus comprising:
   a resonator configured to transmit wireless power;
   a power supply unit configured to supply power;
   a converter configured to adjust a voltage applied to an input resistor of the power supply unit by converting the supplied power and output the converted power to the resonator;
   a first switching unit configured to connect the resonator to the power supply unit, and disconnect the resonator from the power supply unit; and
   a controller configured to control the first switching unit based on a result of comparing an amount of a current flowing into the resonator to an amount of predetermined current,
   wherein the resonator is disconnected from the power supply unit and the input resistor in response to the first switching unit being turned off.

2. The apparatus of claim 1, wherein the controller comprises a current sensor configured to sense the amount of the current based on the voltage applied to the input resistor.

3. The apparatus of claim 2, wherein:
   the current sensor comprises a comparator configured to compare the voltage applied to the input resistor to predetermined voltage corresponding to an amount of predetermined current; and
   the controller is configured to control a turning on and off of the first switching unit based on a result of the comparing.

4. The apparatus of claim 1, wherein the controller is configured to turn off the first switching unit to disconnect the resonator from the power supply unit in response to the voltage applied to the input resistor being greater than or equal to a reference voltage.

5. The apparatus of claim 1, wherein the first switching unit comprises:
   a transistor disposed between the power supply unit and the resonator; and
   a diode connected in series to the transistor.

6. The apparatus of claim 1, wherein the input resistor is connected with the power supply unit in series.

* * * * *